(12) United States Patent
Omura et al.

(10) Patent No.: US 7,471,244 B2
(45) Date of Patent: Dec. 30, 2008

(54) MONITOR UNITS FOR TELEVISION SIGNALS

(75) Inventors: Jim Omura, San Francisco, CA (US); Matthew Rabinowitz, Portola Valley, CA (US); James J. Spilker, Jr., Woodside, CA (US); Ju-Yong Do, Stanford, CA (US); Andy Lee, Union City, CA (US)

(73) Assignee: Rosum Corporation, Mountain View, CA (US)

( * ) Notice: Subject to any disclaimer, the term of this patent is extended or adjusted under 35 U.S.C. 154(b) by 177 days.

(21) Appl. No.: 11/552,231

(22) Filed: Oct. 24, 2006

(65) Prior Publication Data

US 2007/0182633 A1 Aug. 9, 2007

Related U.S. Application Data

(63) Continuation-in-part of application No. 09/932,010, filed on Aug. 17, 2001, now Pat. No. 7,126,536, which is a continuation-in-part of application No. 09/887,158, filed on Jun. 21, 2001, now abandoned.

(60) Provisional application No. 60/732,559, filed on Nov. 2, 2005, provisional application No. 60/293,812, filed on May 25, 2001, provisional application No. 60/293,813, filed on May 25, 2001, provisional application No. 60/293,646, filed on May 25, 2001, provisional application No. 60/281,269, filed on Apr. 3, 2001, provisional application No. 60/281,270, filed on Apr. 3, 2001, provisional application No. 60/265,675, filed on Feb. 2, 2001.

(51) Int. Cl.
*G01S 3/02* (2006.01)

(52) U.S. Cl. .................... 342/463; 342/457

(58) Field of Classification Search ................ 342/457, 342/463–465; 348/473, 476, 477
See application file for complete search history.

(56) References Cited

U.S. PATENT DOCUMENTS

| | | | |
|---|---|---|---|
| 4,555,707 | A | 11/1985 | Connelly |
| 4,652,884 | A | 3/1987 | Starker |
| 4,700,306 | A | 10/1987 | Wallmander |

(Continued)

FOREIGN PATENT DOCUMENTS

DE 3242997 A1 5/1984

(Continued)

OTHER PUBLICATIONS

Parkinson, B.W., et al., "Autonomous GPS Integrity Monitoring Using the Pseudorange Residual," *Journal of the Institute of Navigation* (1988), vol. 35, No. 2, pp. 255-274.

(Continued)

*Primary Examiner*—Dao L Phan
(74) *Attorney, Agent, or Firm*—Richard A. Dunning, Jr.

(57) ABSTRACT

Apparatus having corresponding methods comprises a reference clock; a receiver to receive a wireless television signal, wherein the wireless television signal is transmitted by a television transmitter according to a transmitter clock; and a clock offset unit to determine a clock offset between the reference clock and the transmitter clock based on the wireless television signal.

15 Claims, 9 Drawing Sheets

U.S. PATENT DOCUMENTS

| | | | |
|---|---|---|---|
| 4,876,598 A * | 10/1989 | Carlstedt et al. | 348/572 |
| 4,894,662 A | 1/1990 | Counselman | |
| 5,045,861 A | 9/1991 | Duffett-Smith | |
| 5,157,686 A | 10/1992 | Omura et al. | |
| 5,166,952 A | 11/1992 | Omura et al. | |
| 5,271,034 A | 12/1993 | Abaunza | |
| 5,323,322 A | 6/1994 | Mueller et al. | |
| 5,398,034 A | 3/1995 | Spilker, Jr. | |
| 5,481,316 A | 1/1996 | Patel | |
| 5,504,492 A | 4/1996 | Class et al. | |
| 5,510,801 A | 4/1996 | Engelbrecht et al. | |
| 5,604,765 A | 2/1997 | Bruno et al. | |
| 5,630,206 A | 5/1997 | Urban et al. | |
| 5,648,982 A | 7/1997 | Durrant et al. | |
| 5,774,829 A | 6/1998 | Cisneros et al. | |
| 5,920,284 A | 7/1999 | Victor | |
| 5,940,411 A * | 8/1999 | Takeda | 714/701 |
| 5,952,958 A | 9/1999 | Speasl et al. | |
| 5,953,311 A | 9/1999 | Davies et al. | |
| 6,006,097 A | 12/1999 | Hornfeldt et al. | |
| 6,016,119 A | 1/2000 | Krasner | |
| 6,055,020 A * | 4/2000 | Lorenz et al. | 348/473 |
| 6,078,284 A | 6/2000 | Levanon | |
| 6,094,168 A | 7/2000 | Duffett-Smith et al. | |
| 6,107,959 A | 8/2000 | Levanon | |
| 6,137,441 A | 10/2000 | Dai et al. | |
| 6,147,642 A | 11/2000 | Perry et al. | |
| 6,181,921 B1 | 1/2001 | Konisi et al. | |
| 6,184,921 B1 | 2/2001 | Limberg | |
| 6,201,497 B1 | 3/2001 | Snyder et al. | |
| 6,215,778 B1 | 4/2001 | Lomp et al. | |
| 6,289,280 B1 | 9/2001 | Fernandez-Corbaton et al. | |
| 6,317,452 B1 | 11/2001 | Durrant et al. | |
| 6,317,500 B1 | 11/2001 | Murphy | |
| 6,373,432 B1 | 4/2002 | Rabinowitz et al. | |
| 6,374,177 B1 | 4/2002 | Lee et al. | |
| 6,433,740 B1 | 8/2002 | Gilhousen | |
| 6,437,832 B1 | 8/2002 | Grabb et al. | |
| 6,522,297 B1 | 2/2003 | Rabinowitz et al. | |
| 6,559,800 B2 | 5/2003 | Rabinowitz et al. | |
| 6,590,529 B2 | 7/2003 | Schwoegler | |
| 6,646,603 B2 | 11/2003 | Dooley et al. | |
| 6,717,547 B2 | 4/2004 | Spilker, Jr. et al. | |
| 6,727,847 B2 | 4/2004 | Rabinowitz et al. | |
| 6,753,812 B2 | 6/2004 | Rabinowitz et al. | |
| 6,806,830 B2 | 10/2004 | Panasik et al. | |
| 6,839,024 B2 | 1/2005 | Spilker, Jr. et al. | |
| 6,859,173 B2 | 2/2005 | Spilker, Jr. et al. | |
| 6,861,984 B2 | 3/2005 | Rabinowitz et al. | |
| 6,879,286 B2 | 4/2005 | Rabinowitz et al. | |
| 6,914,560 B2 | 7/2005 | Spilker, Jr. et al. | |
| 6,917,328 B2 | 7/2005 | Rabinowitz et al. | |
| 6,937,866 B2 | 8/2005 | Duffett-Smith et al. | |
| 6,952,182 B2 | 10/2005 | Spilker, Jr. et al. | |
| 6,961,020 B2 | 11/2005 | Rabinowitz et al. | |
| 6,963,306 B2 | 11/2005 | Spilker, Jr. et al. | |
| 6,970,132 B2 | 11/2005 | Spilker, Jr. et al. | |
| 7,042,396 B2 | 5/2006 | Omura et al. | |
| 7,042,949 B1 | 5/2006 | Omura et al. | |
| 7,120,123 B1 * | 10/2006 | Quigley et al. | 370/252 |
| 7,126,536 B2 | 10/2006 | Rabinowitz et al. | |
| 7,190,704 B2 * | 3/2007 | Rabenko et al. | 370/508 |
| 7,260,378 B2 | 8/2007 | Holland et al. | |
| 7,372,405 B2 | 5/2008 | Rabinowitz et al. | |
| 2002/0184653 A1 | 12/2002 | Pierce et al. | |
| 2002/0199196 A1 | 12/2002 | Rabinowitz et al. | |
| 2004/0073914 A1 | 4/2004 | Spilker et al. | |
| 2004/0201779 A1 | 10/2004 | Spilker et al. | |
| 2005/0066373 A1 | 3/2005 | Rabinowitz | |
| 2005/0251844 A1 | 11/2005 | Martone et al. | |
| 2007/0050824 A1 | 3/2007 | Lee et al. | |
| 2007/0121555 A1 | 5/2007 | Burgess et al. | |
| 2007/0131079 A1 | 6/2007 | Opshaug et al. | |
| 2007/0296632 A1 | 12/2007 | Opshaug et al. | |

FOREIGN PATENT DOCUMENTS

| | | |
|---|---|---|
| EP | 58129277 | 8/1983 |
| GB | 2 222 922 A | 3/1990 |
| GB | 2 254 508 A | 10/1992 |

OTHER PUBLICATIONS

Rabinowitz, M., "A Differential Carrier Phase Navigation System Combining GPS with Low Earth Orbit Satellites for Rapid Resolution of Integer Cycle Ambiguities," *PhD Thesis for Department of Electrical Engineering, Stanford University* (Dec. 2000), pp. 59-73.

Spilker, Jr., J.J., "Fundamentals of Signal Tracking Theory," *Global Positioning System: Theory and Applications* (1994), vol. 1, Chapter 7, pp. 245-327.

Van Dierendock, A.J., "GPS Receivers," *Global Positioning System: Theory and Applications* (1995), vol. 1, Chapter 8, pp. 329-407.

Li, X., et al., "Indoor Geolocation Using OFDM Signals in HIPERLAN/2 Wireless LANS," 11th IEEE International Symposium on Personal Indoor and Mobile Radio Communications, PIMRC 2000, Proceedings (Cat. No. 00TH8525), Proceedings of 11th International Symposium on Personal Indoor and Mobile Radio Communication, London, UK, Sep. 18-21, pp. 1449-1453, vol. 2, XPO10520871, 2000, Piscataway, NJ, USA, IEEE, USA, ISBN; 9-7803-6463-5, Chapter I and III.

Rabinowitz, M., et al., "Positioning Using the ATSC Digital Television Signal," Rosum whitepaper, Online! 2001, XP002235053, Retrieved from the Internet on Mar. 13, 2003 at URL www.rosum.com/whitepaper 8-7-01.pdf.

Duffett-Smith, et al., Precise Time Transfer in a Mobile Radio Terminal, ION NTM 2005, Jan. 24-26, 2005, San Diego, CA, pp. 1101-1106.

U.S. Appl. No. 10/008,613, Pierce, et al.
U.S. Appl. No. 11/380,691, Metzler, et al.
U.S. Appl. No. 11/535,485, Furman, et al.
U.S. Appl. No. 11/622,838, Rabinowitz, et al.
U.S. Appl. No. 11/770,162, Furman, et al.
U.S. Appl. No. 11/865,881, Opshaug, et al.
U.S. Appl. No. 12/117,676, Rabinowitz, et al.
U.S. Appl. No. 12/168,141, Furman, et al.

* cited by examiner

MONITOR UNITS FOR TELEVISION SIGNALS

CROSS-REFERENCE TO RELATED APPLICATIONS

This application is a CIP of Ser. No. 09/932,010 Aug. 17, 2001 which is a CIP of Ser. No. 09/887,158 Jun. 21, 2001 ABN and which claims the benefit of 60/265,675 Feb. 2, 2001 and which claims the benefit of 60/281,270 Apr. 3, 2001 and which claims the benefit of 60/281,269 Apr. 3, 2001 and which claims the benefit of 60/293,812 May 25, 2001 and which claims the benefit of 60/293,813 May 25, 2001 and which claims the benefit of 60/293,646 May 25, 2001.

This application claims benefit of 60/732,559 Nov. 2, 2005.

The subject matter of all of the foregoing are incorporated herein by reference.

BACKGROUND

The present invention relates generally to position determination, and particularly to position determination using DTV signals.

There have long been methods of two-dimensional latitude/longitude position location systems using radio signals. In wide usage have been terrestrial systems such as Loran C and Omega, and a satellite-based system known as Transit. Another satellite-based system enjoying increased popularity is the Global Positioning System (GPS).

Initially devised in 1974, GPS is widely used for position location, navigation, survey, and time transfer. The GPS system is based on a constellation of 24 on-orbit satellites in sub-synchronous 12 hour orbits. Each satellite carries a precision clock and transmits a pseudo-noise signal, which can be precisely tracked to determine pseudo-range. By tracking 4 or more satellites, one can determine precise position in three dimensions in real time, world-wide. More details are provided in B. W. Parkinson and J. J. Spilker, Jr., Global Positioning System-Theory and Applications, Volumes I and II, AIAA, Washington, D.C. 1996.

GPS has revolutionized the technology of navigation and position location. However in some situations, GPS is less effective. Because the GPS signals are transmitted at relatively low power levels (less than 100 watts) and over great distances, the received signal strength is relatively weak (on the order of −160 dBw as received by an omni-directional antenna). Thus the signal is marginally useful or not useful at all in the presence of blockage or inside a building.

There has even been a proposed system using conventional analog National Television System Committee (NTSC) television signals to determine position. This proposal is found in a U.S. patent entitled "Location Determination System And Method Using Television Broadcast Signals," U.S. Pat. No. 5,510,801, issued Apr. 23, 1996. However, the present analog TV signal contains horizontal and vertical synchronization pulses intended for relatively crude synchronization of the TV set sweep circuitry. Further, in 2006 the Federal Communication Commission (FCC) will consider turning off NTSC transmitters and reassigning that valuable spectrum so that it can be auctioned for other purposes deemed more valuable.

SUMMARY

In general, in one aspect, the invention features an apparatus comprising: a reference clock; a receiver to receive a wireless television signal, wherein the wireless television signal is transmitted by a television transmitter according to a transmitter clock; and a clock offset unit to determine a clock offset between the reference clock and the transmitter clock based on the wireless television signal.

In some embodiments, the wireless television signal comprises at least one of: an American Television Standards Committee (ATSC) digital television (DTV) signal; a Digital Video Broadcasting (DVB) signal; an Integrated Services Digital Broadcasting-Terrestrial (ISDB-T) signal; and a National Television System Committee (NTSC) analog television signal. In some embodiments, a location of a user terminal is determined based on the clock offset, a pseudorange determined between the user terminal and the television transmitter based on the wireless television signal, and a location of the television transmitter. Some embodiments comprise a processor to determine the location of the user terminal. Some embodiments comprise a satellite receiver to receive a satellite positioning signal; a processor to determine the location of the receiver based on the satellite positioning signal; and a time transfer unit to adjust the reference clock based on the satellite positioning signal. In some embodiments, the satellite positioning signal comprises a global positioning system (GPS) signal.

In general, in one aspect, the invention features an apparatus comprising: means for generating a reference clock signal; means for receiving a wireless television signal, wherein the wireless television signal is transmitted by a television transmitter according to a transmitter clock; and means for determining a clock offset between the reference clock signal and the transmitter clock based on the wireless television signal.

In some embodiments, the wireless television signal comprises at least one of: an American Television Standards Committee (ATSC) digital television (DTV) signal; a Digital Video Broadcasting (DVB) signal; an Integrated Services Digital Broadcasting-Terrestrial (ISDB-T) signal; and a National Television System Committee (NTSC) analog television signal. In some embodiments, a location of a user terminal is determined based on the clock offset, a pseudorange determined between the user terminal and the television transmitter based on the wireless television signal, and a location of the television transmitter. Some embodiments comprise means for determining the location of the user terminal. Some embodiments comprise means for receiving a satellite positioning signal; means for determining the location of the receiver based on the satellite positioning signal; and means for adjusting the reference clock signal based on the satellite positioning signal. In some embodiments, the satellite positioning signal comprises a global positioning system (GPS) signal.

In general, in one aspect, the invention features a method comprising: generating a reference clock signal; receiving a wireless television signal, wherein the wireless television signal is transmitted by a television transmitter according to a transmitter clock; and determining a clock offset between the reference clock signal and the transmitter clock based on the wireless television signal.

In some embodiments, the wireless television signal comprises at least one of: an American Television Standards Committee (ATSC) digital television (DTV) signal; a Digital Video Broadcasting (DVB) signal; an Integrated Services Digital Broadcasting-Terrestrial (ISDB-T) signal; and a National Television System Committee (NTSC) analog television signal. In some embodiments, a location of a user terminal is determined based on the clock offset, a pseudorange determined between the user terminal and the television transmitter based on the wireless television signal, and a location of the television transmitter. Some embodiments comprise determining the location of the user terminal. Some embodiments comprise receiving a satellite positioning signal; determining the location of the receiver based on the satellite positioning signal; and adjusting the reference clock signal based on the satellite positioning signal. In some embodiments, the satellite positioning signal comprises a global positioning system (GPS) signal.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Introduction

Figure 1:
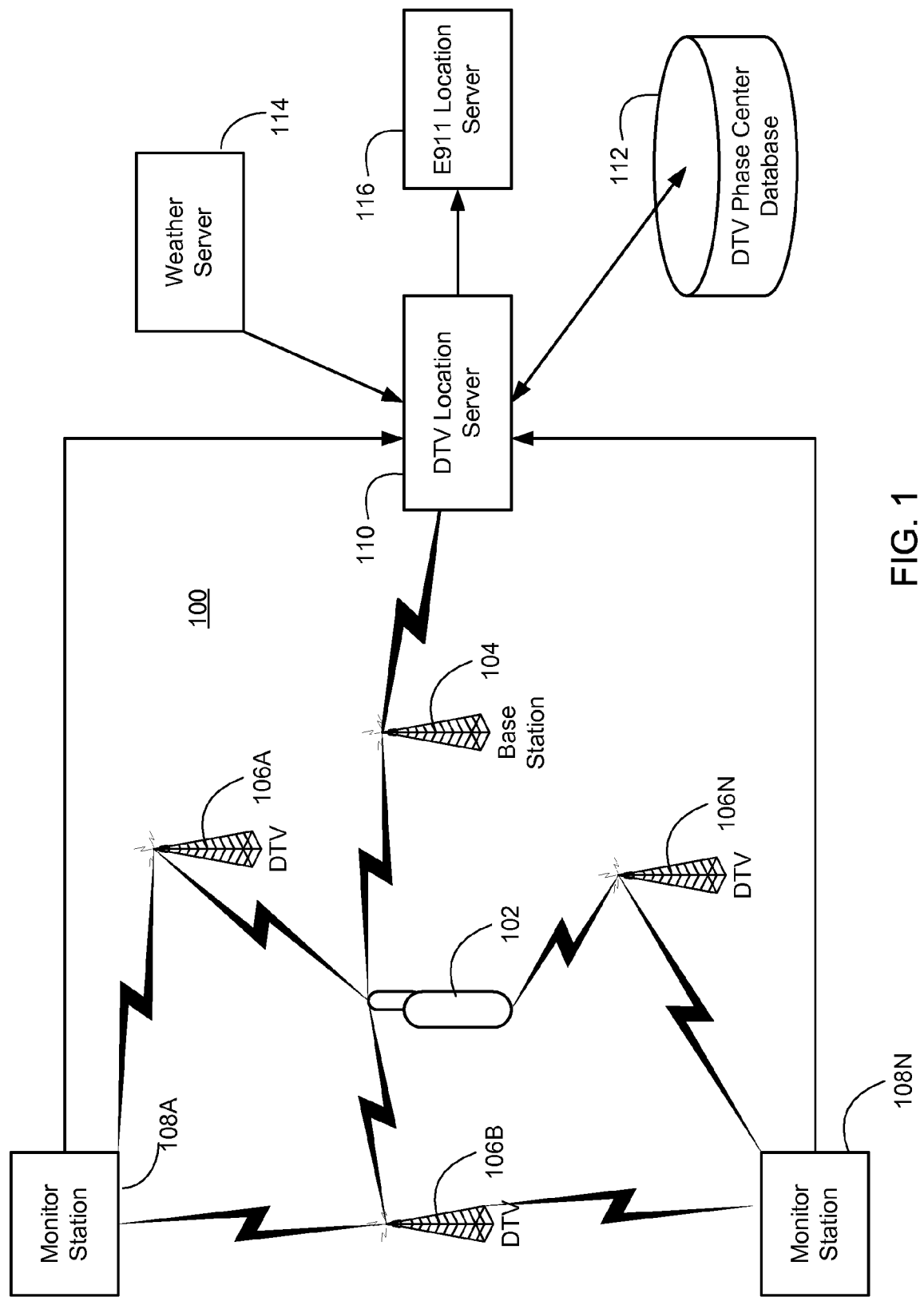
FIG. 1 depicts an implementation of the present invention including a user terminal that communicates over an air link with a base station.

Broadcast television signals can be used to determine the position of a user terminal. Techniques for determining the position of a user terminal using the American Television Standards Committee (ATSC) digital television (DTV) signal are disclosed in U.S. Pat. No. 6,861,984, "Position Location using Broadcast Digital Television Signals," the disclosure thereof incorporated by reference herein in its entirety. Techniques for determining the position of a user terminal using the European Telecommunications Standards Institute (ETSI) Digital Video Broadcasting (DVB) signal are disclosed in U.S. Non-provisional patent application Ser. No. 09/932,010, "Wireless Position Location Using the Japanese ISDB-T Digital TV Signals," the disclosure thereof incorporated by reference herein in its entirety. Techniques for determining the position of a user terminal using the Japanese Integrated Services Digital Broadcasting-Terrestrial (ISDB-T) signal are disclosed in U.S. Pat. No. 6,952,182, "Position Location using Terrestrial Digital Video Broadcast Television Signals," the disclosure thereof incorporated by reference herein in its entirety. Techniques for determining the position of a user terminal using the NTSC (National Television System Committee) analog television (TV) signal are disclosed in U.S. Pat. No. 6,559,800 and U.S. Pat. No. 6,522,297, the disclosures thereof incorporated by reference herein in their entirety.

Each of these television signals includes components that can be used to obtain a pseudo-range to the transmitter of the television signal. When multiple such pseudo-ranges are known, and the locations of the transmitters are known, the position of the user terminal can be determined with accuracy. Suitable components within the ATSC digital television signal include synchronization codes such as the Field Synchronization Segment within an ATSC data frame and the Synchronization Segment within a Data Segment within an ATSC data frame. Suitable components within the ETSI DVB and ISDB-T digital television signals include scattered pilot carriers. Suitable components within the NTSC analog television signal include the horizontal synchronization pulse, the horizontal blanking pulse, the horizontal blanking pulse and horizontal synchronization pulse taken together, the ghost canceling reference signal, the vertical interval test signal, and other chirp-type signals.

Positioning techniques using television signals should revolutionize the technology of navigation and position location. The ubiquitous availability of television signals allows for coverage anywhere that television is available. In fact, with the use of time-gated delay-lock loops, it is possible to use television signals for positioning even beyond those areas where television reception is available. Details are provided in, for example, U.S. Pat. No. 6,753,812, "Time-Gated Non-coherent Delay Lock Loop Tracking of Digital Television Signals," the disclosure thereof incorporated by reference herein in its entirety.

Embodiments of the present invention provide monitor units for position determination using television signals. The monitor units determine parameters of the television signals for use in geolocation of mobile units referred to herein as "user terminals." For example, the monitor units can determine the clock offsets of the transmitter clocks in the television transmitters. The clock offsets are then used to accurately determine the positions of the user terminals.

In some embodiments, the monitor units are stationary units having fixed locations that are determined with a high degree of accuracy by survey, satellite positioning, positioning using television signals, and the like. The stationary monitor units can obtain accurate time from satellites such as GPS.

In some embodiments, mobile user terminals act as monitor units, and can obtain position and time from satellites such as GPS. When GPS is not available, several mobile monitor units can be used together to determine parameters of the television signals such as transmitter clock offsets, to determine clock offsets of the receiver clocks in the user terminals, and to determine positions of the user terminals.

Referring to FIG. 1, an example implementation 100 includes a user terminal 102 that communicates over an air link with a base station 104. In one implementation, user terminal 102 is a wireless telephone and base station 104 is a wireless telephone base station. In one implementation, base station 104 is part of a mobile MAN (metropolitan area network) or WAN (wide area network).

FIG. 1 is used to illustrate various aspects of the invention but the invention is not limited to this implementation. For example, the phrase "user terminal" is meant to refer to any object capable of implementing the DTV position location described. Examples of user terminals include PDAs, mobile phones, cars and other vehicles, and any object which could include a chip or software implementing DTV position location. It is not intended to be limited to objects which are "terminals" or which are operated by "users."

Position Location Performed by a DTV Location Server

Figure 2:
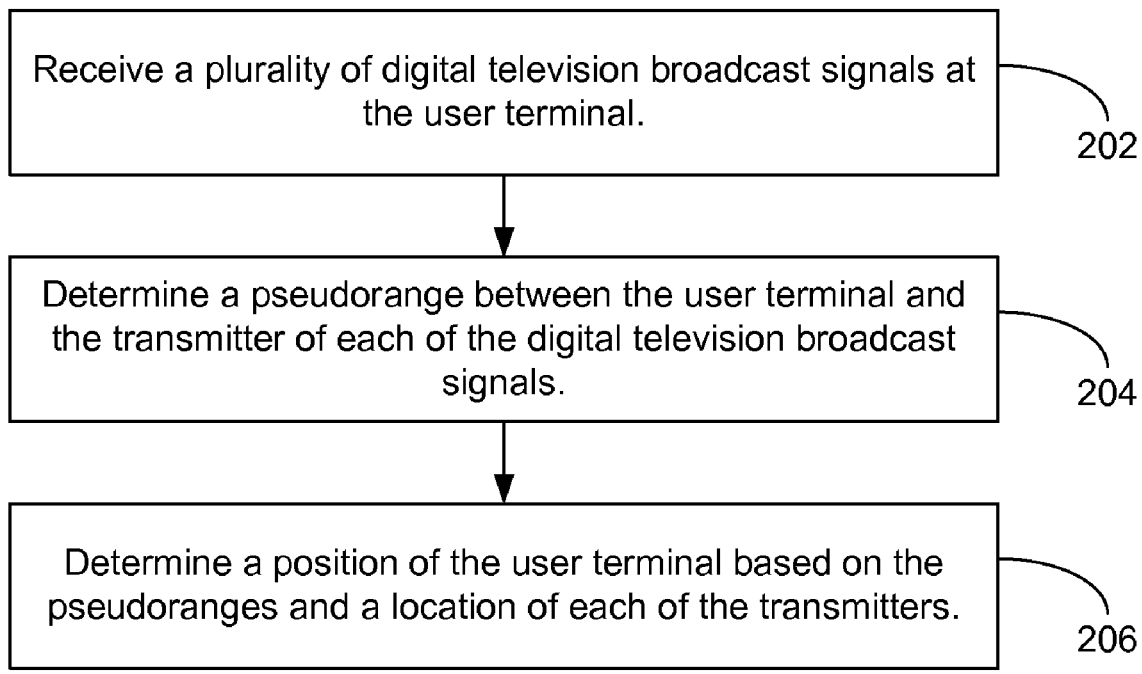
FIG. 2 illustrates an operation of an implementation of the invention.

FIG. 2 illustrates an operation of implementation 100. User terminal 102 receives DTV signals from a plurality of DTV transmitters 106A and 106B through 106N (step 202).

Various methods can be used to select which DTV channels to use in position location. In one implementation, a DTV location server 110 tells user terminal 102 of the best DTV channels to monitor. In one implementation, user terminal 102 exchanges messages with DTV location server 110 by way of base station 104. In one implementation user terminal 102 selects DTV channels to monitor based on the identity of base station 104 and a stored table correlating base stations and DTV channels. In another implementation, user terminal 102 can accept a location input from the user that gives a general indication of the area, such as the name of the nearest city; and uses this information to select DTV channels for processing. In one implementation, user terminal 102 scans available DTV channels to assemble a fingerprint of the location based on power levels of the available DTV channels. User terminal 102 compares this fingerprint to a stored table that matches known fingerprints with known locations to select DTV channels for processing.

User terminal 102 determines a pseudo-range between the user terminal 102 and each DTV transmitter 106 (step 204). Each pseudo-range represents the time difference (or equivalent distance) between a time of transmission from a transmitter 106 of a component of the DTV broadcast signal and a time of reception at the user terminal 102 of the component, as well as a clock offset at the user terminal.

User terminal 102 transmits the pseudo-ranges to DTV location server 110. In one implementation, DTV location server 110 is implemented as a general-purpose computer executing software designed to perform the operations described herein. In another implementation, DTV location server is implemented as an ASIC (application-specific integrated circuit). In one implementation, DTV location server 110 is implemented within or near base station 104.

The DTV signals are also received by a plurality of monitor units 108A-N, which can include fixed and/or mobile monitor units 108. Each monitor unit 108 can be implemented as a small unit including a transceiver and processor. Fixed monitor units can be mounted in a convenient location such as a utility pole, a DTV transmitter 106, or a base station 104. In one implementation, monitor units are implemented on satellites.

Each monitor unit 108 measures, for each of the DTV transmitters 106 from which it receives DTV signals, a time offset between the local clock of that DTV transmitter and a reference clock. In one implementation the reference clock is derived from GPS signals. The use of a reference clock permits the determination of the time offset for each DTV transmitter 106 when multiple monitor units 108 are used, since each monitor unit 108 can determine the time offset with respect to the reference clock. Thus, offsets in the local clocks of the monitor units 108 do not affect these determinations.

In another implementation, no external time reference is needed. According to this implementation, a single monitor unit receives DTV signals from all of the same DTV transmitters as does user terminal 102. In effect, the local clock of the single monitor unit functions as the time reference.

In one implementation, each time offset is modeled as a fixed offset. In another implementation each time offset is modeled as a second order polynomial fit of the form $$\text{Offset} = a + b(t-T) + c(t-T)^2 \qquad (1)$$

that can be described by a, b, c, and T. In either implementation, each measured time offset is transmitted periodically to the DTV location server using the Internet, a secured modem connection or the like. In one implementation, the location of each monitor unit 108 is determined using GPS receivers.

DTV location server 110 receives information describing the phase center (i.e., the location) of each DTV transmitter 106 from a database 112. In one implementation, the phase center of each DTV transmitter 106 is measured by using monitor units 108 at different locations to measure the phase center directly. In another implementation, the phase center of each DTV transmitter 106 is measured by surveying the antenna phase center.

In one implementation, DTV location server 110 receives weather information describing the air temperature, atmospheric pressure, and humidity in the vicinity of user terminal 102 from a weather server 114. The weather information is available from the Internet and other sources. DTV location server 110 determines tropospheric propagation velocity from the weather information using techniques such as those disclosed in B. Parkinson and J. Spilker, Jr. Global Positioning System-Theory and Applications, AIAA, Washington, D.C., 1996, Vol. 1, Chapter 17 Tropospheric Effects on GPS by J. Spilker, Jr.

DTV location server 110 can also receive from base station 104 information which identifies a general geographic location of user terminal 102. For example, the information can identify a cell or cell sector within which a cellular telephone is located. This information is used for ambiguity resolution, as described below.

Figure 3:
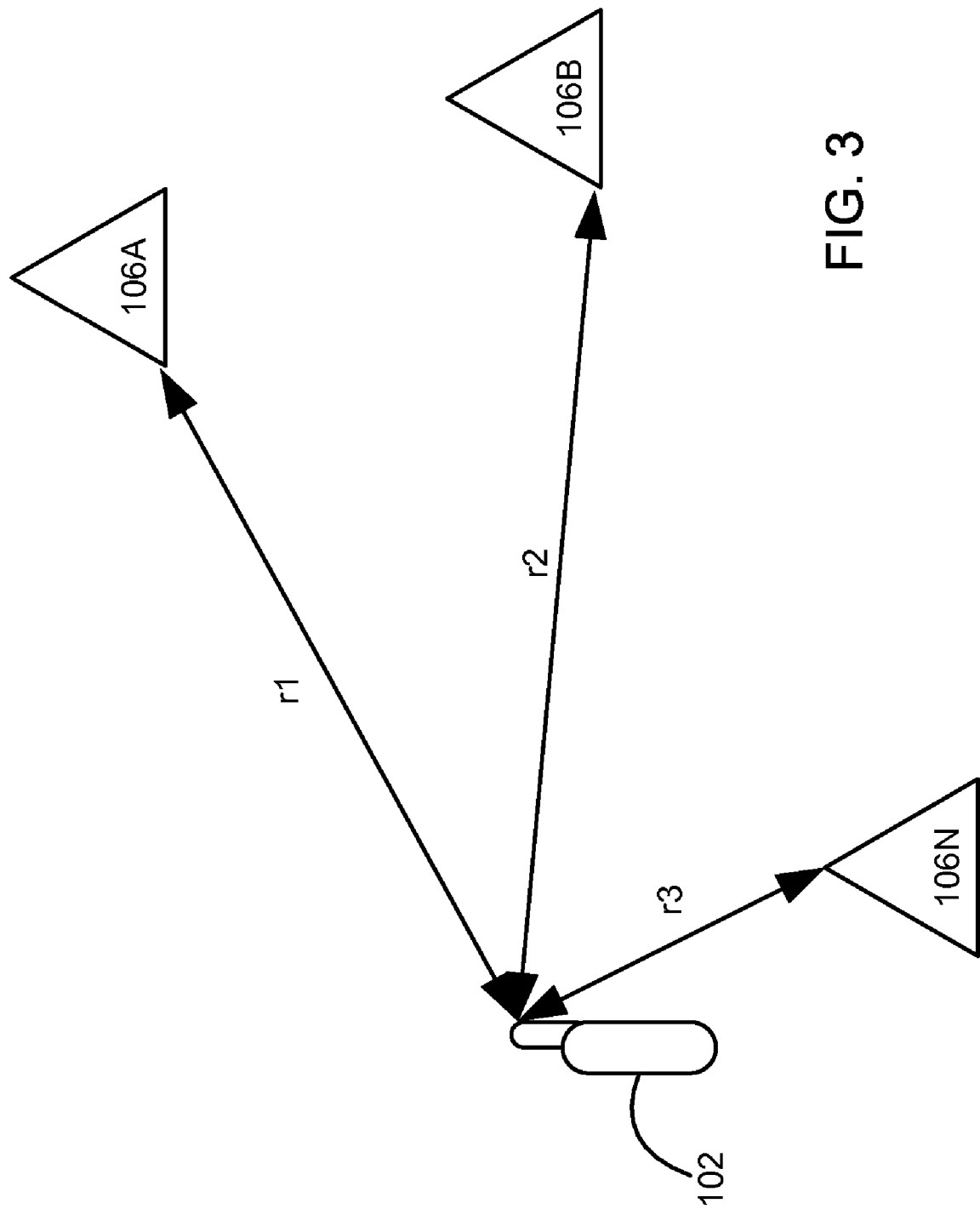
FIG. 3 depicts the geometry of a position determination using 3 DTV transmitters.

DTV location server 110 determines a position of the user terminal based on the pseudo-ranges and a location of each of the transmitters (step 206). FIG. 3 depicts the geometry of a position determination using three DTV transmitters 106. DTV transmitter 106A is located at position (x1, y1). The range between user terminal 102 and DTV transmitter 106A is r1. DTV 106B transmitter is located at position (x2, y2). The range between user terminal 102 and DTV transmitter 106B is r2. DTV transmitter 106N is located at position (x3, y3). The range between user terminal 102 and DTV transmitter 106N is r3.

DTV location server 110 may adjust the value of each pseudo-range according to the tropospheric propagation velocity and the time offset for the corresponding DTV transmitter 106. DTV location server 110 uses the phase center information from database 112 to determine the position of each DTV transmitter 106.

User terminal 102 makes three or more pseudo-range measurements to solve for three unknowns, namely the position (x, y) and clock offset T of user terminal 102. In other implementations, the techniques disclosed herein are used to determine position in three dimensions such as longitude, latitude, and altitude, and can include factors such as the altitude of the DTV transmitters.

The three pseudo-range measurements pr1, pr2 and pr3 are given by $$pr1 = r1 + T \qquad (2)$$

$$pr2 = r2 + T \qquad (3)$$

$$pr3 = r3 + T \qquad (4)$$

The three ranges can be expressed as $$r1=|X-X1| \quad (5)$$

$$r2=|X-X2| \quad (6)$$

$$r3=|X-X3| \quad (7)$$

where X represents the two-dimensional vector position (x, y) of user terminal, X1 represents the two-dimensional vector position (x1, y1) of DTV transmitter 106A, X2 represents the two-dimensional vector position (x2, y2) of DTV transmitter 106B, and X3 represents the two-dimensional vector position (x3, y3) of DTV transmitter 106N. These relationships produce three equations in which to solve for the three unknowns x, y, and T. DTV locations server 110 solves these equations according to conventional well-known methods. In an E911 application, the position of user terminal 102 is transmitted to E911 location server 116 for distribution to the proper authorities. In another application, the position is transmitted to user terminal 102.

In another implementation, user terminal 102 does not compute pseudo-ranges, but rather takes measurements of the DTV signals that are sufficient to compute pseudo-range, and transmits these measurements to DTV location server 110. DTV location server 110 then computes the pseudo-ranges based on the measurements, and computes the position based on the pseudo-ranges, as described above.

Position Location Performed by User Terminal

In another implementation, the position of user terminal 102 is computed by user terminal 102. In this implementation, all of the necessary information is transmitted to user terminal 102. This information can be transmitted to user terminal by DTV location server 110, base station 104, one or more DTV transmitters 106, or any combination thereof. User terminal 102 then measures the pseudo-ranges and solves the simultaneous equations as described above. This implementation is now described.

User terminal 102 receives the time offset between the local clock of each DTV transmitter and a reference clock. User terminal 102 also receives information describing the phase center of each DTV transmitter 106 from a database 112.

User terminal 102 receives the tropospheric propagation velocity computed by DTV locations server 110. In another implementation, user terminal 102 receives weather information describing the air temperature, atmospheric pressure, and humidity in the vicinity of user terminal 102 from a weather server 114, and determines tropospheric propagation velocity from the weather information using conventional techniques.

User terminal 102 can also receive from base station 104 information which identifies the rough location of user terminal 102. For example, the information can identify a cell or cell sector within which a cellular telephone is located. This information is used for ambiguity resolution, as described below.

User terminal 102 receives DTV signals from a plurality of DTV transmitters 106 and determines a pseudo-range between the user terminal 102 and each DTV transmitter 106. User terminal 102 then determines its position based on the pseudo-ranges and the phase centers of the transmitters.

In any of these of the implementations, should only two DTV transmitters be available, the position of user terminal 102 can be determined using the two DTV transmitters and the offset T computed during a previous position determination. The values of T can be stored or maintained according to conventional methods.

In one implementation, base station 104 determines the clock offset of user terminal 102. In this implementation, only two DTV transmitters are required for position determination. Base station 104 transmits the clock offset T to DTV location server 110, which then determines the position of user terminal 102 from the pseudo-range computed for each of the DTV transmitters.

In another implementation, when only one or two DTV transmitters are available for position determination, GPS is used to augment the position determination.

Receiver Architecture

Figure 4:
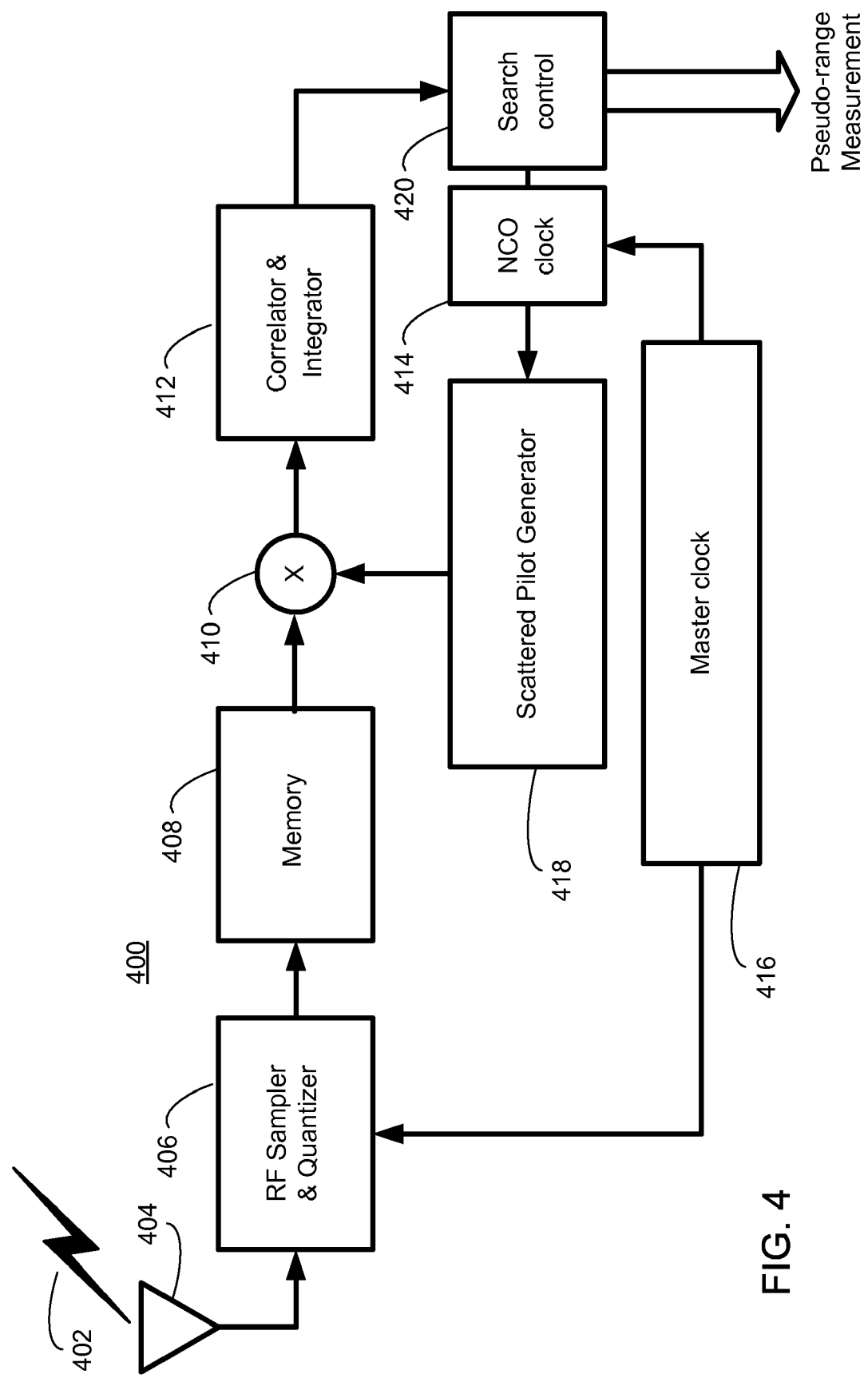
FIG. 4 depicts an implementation of a receiver for use in generating a pseudo-range measurement.

FIG. 4 depicts an implementation 400 of a receiver for use in generating a pseudo-range measurement. In some implementations, receiver 400 is implemented within user terminal 102. In some implementations, receiver 400 is implemented within monitor units 108.

RF Sampler & Quantizer 406 sequentially tunes antenna 404 to each of the digital TV signals 402 in the area, RF amplifies, and downconverts the signal to IF or baseband. The wideband filtered signal with its 8 MHz bandwidth is then sampled and quantized by RF sampler and quantizer 406. Then a segment of the quantized signal including 4 or more symbol intervals is stored in memory 408. Preferably a substantially longer segment of perhaps 0.1 seconds or more in duration is used to improve the averaging time and to improve noise performance.

Mixer 410 and correlator and integrator 412 sequentially correlate the stored time segment of the signal with various time offset versions of the reference scattered pilot carrier generated by scattered pilot generator 418. The reference signal is stepped in time by predetermined time steps to find the peak of the autocorrelation function. The step size is selected to produce a number of samples from the autocorrelation function that is sufficient to identify the autocorrelation peak. In one implementation, a large step size is initially used to obtain an estimate of the autocorrelation peak; then a smaller step size is used to refine that estimate. As shown below, implementations of the present invention use time samples spaced by 1/(1116*20,000)=44 ns. A correlator search control 420 searches for the major peak in the autocorrelation function and when found converts that measurement of pseudo-range to digitized form. Receiver 400 then sequentially performs the same set of functions on the other digital TV signals 402 available in the area from other DTV towers. It is not necessary to make multiple measurements from signals transmitted from the same DTV tower. The set of 3 or more pseudo-range measurements is then sent to DTV location server 110 by way of digital cellular or other wireless link.

Note that the position location operation at the subscriber handset or other device need only take place when the subscriber needs position location. For a subscriber walking slowly, in a slowly moving vehicle, or sitting in a building or field in an emergency, this location information need only be measured infrequently. Thus the battery or other power source can be very small.

Although receiver 400 implements a cross-correlator with a sum of digital signals it will be clear to one skilled in the relevant arts that alternate implementations can simplify the circuitry by using FFT/DFT (fast Fourier transform/direct Fourier transform) processing for example. Furthermore, although receiver 400 processes the samples at intermediate frequency (IF), other implementations process the samples in analog or digital form, and can operate at IF or at baseband. Still other implementations process the samples in the frequency domain.

Other signals within the signal structure can also be used for position location. For example, a wide laning technique could be applied to the continuous pilot signals. However, such techniques as wide laning involve inherent resolution of cycle ambiguities. Techniques for resolving such ambiguities are well-known in the art. One such technique is disclosed in M. Rabinowitz, Ph.D. Thesis: A Differential Carrier Phase Navigation System Combining GPS with Low Earth Orbit Satellites for Rapid Resolution of Integer Cycle Ambiguities, 2000, Department of Electrical Engineering, Stanford University, pages 59-76.

In receiver correlators and matched filters there are two important sources of receiver degradation. The user terminal local oscillator is often of relatively poor stability in frequency. This instability affects two different receiver parameters. First, it causes a frequency offset in the receiver signal. Second, it causes the received bit pattern to slip relative to the symbol rate of the reference clock. Both of these effects can limit the integration time of the receiver and hence the processing gain of the receiver. The integration time can be increased by correcting the receiver reference clock. In one implementation a delay lock loop automatically corrects for the receiver clock.

In another implementation a NCO (numerically controlled oscillator) clock 414 adjusts the clock frequency of the receiver to match that of the incoming received signal clock frequency and compensate for drifts and frequency offsets of the local oscillator in user terminal 102. Increased accuracy of the clock frequency permits longer integration times and better performance of the receiver correlator. The frequency control input of NCO clock 414 can be derived from reference clock 416, a receiver symbol clock rate synchronizer, tracking of the pilot carrier, or other clock rate discriminator techniques installed in NCO clock 414.

Position Location Enhancements

Figure 5:
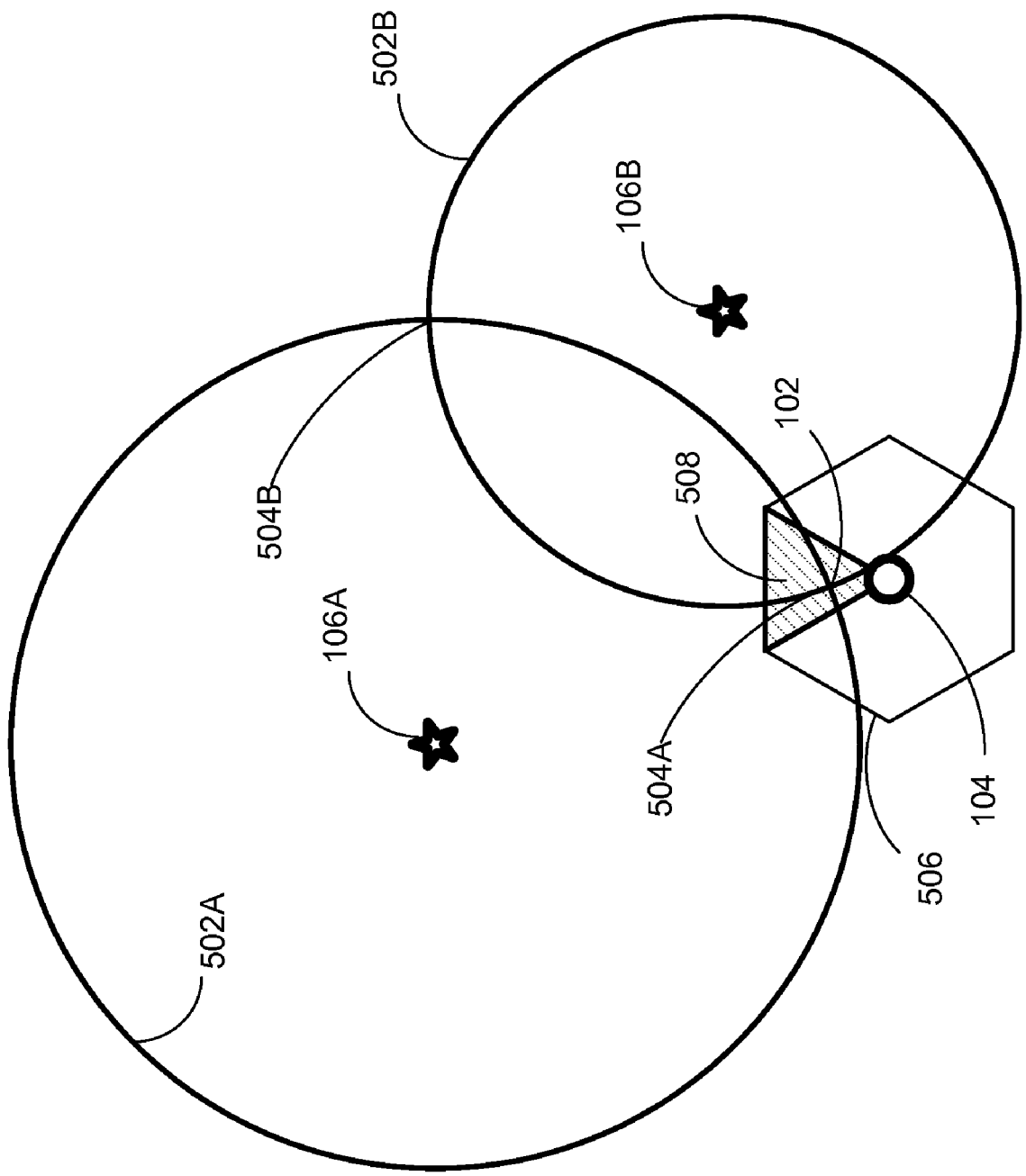
FIG. 5 illustrates a simple example of a position location calculation for a user terminal receiving DTV signals from two separate DTV antennas.

FIG. 5 illustrates a simple example of a position location calculation for a user terminal 102 receiving DTV signals from two separate DTV transmitters 106A and 106B. Circles of constant range 502A and 502B are drawn about each of transmitters 106A and 106B, respectively. The position for a user terminal, including correction for the user terminal clock offset, is then at one of the intersections 504A and 504B of the two circles 502A and 502B. The ambiguity is resolved by noting that base station 104 can determine in which sector 508 of its footprint (that is, its coverage area) 506 the user terminal is located. Of course if there are more than two DTV transmitters in view, the ambiguity can be resolved by taking the intersection of three circles.

In one implementation, user terminal 102 can accept an input from a user that gives a general indication of the area, such as the name of the nearest city. In one implementation, user terminal 102 scans available DTV channels to assemble a fingerprint of the location. User terminal 102 compares this fingerprint to a stored table that matches known fingerprints with known locations to identify the current location of user terminal 102.

Figure 6:
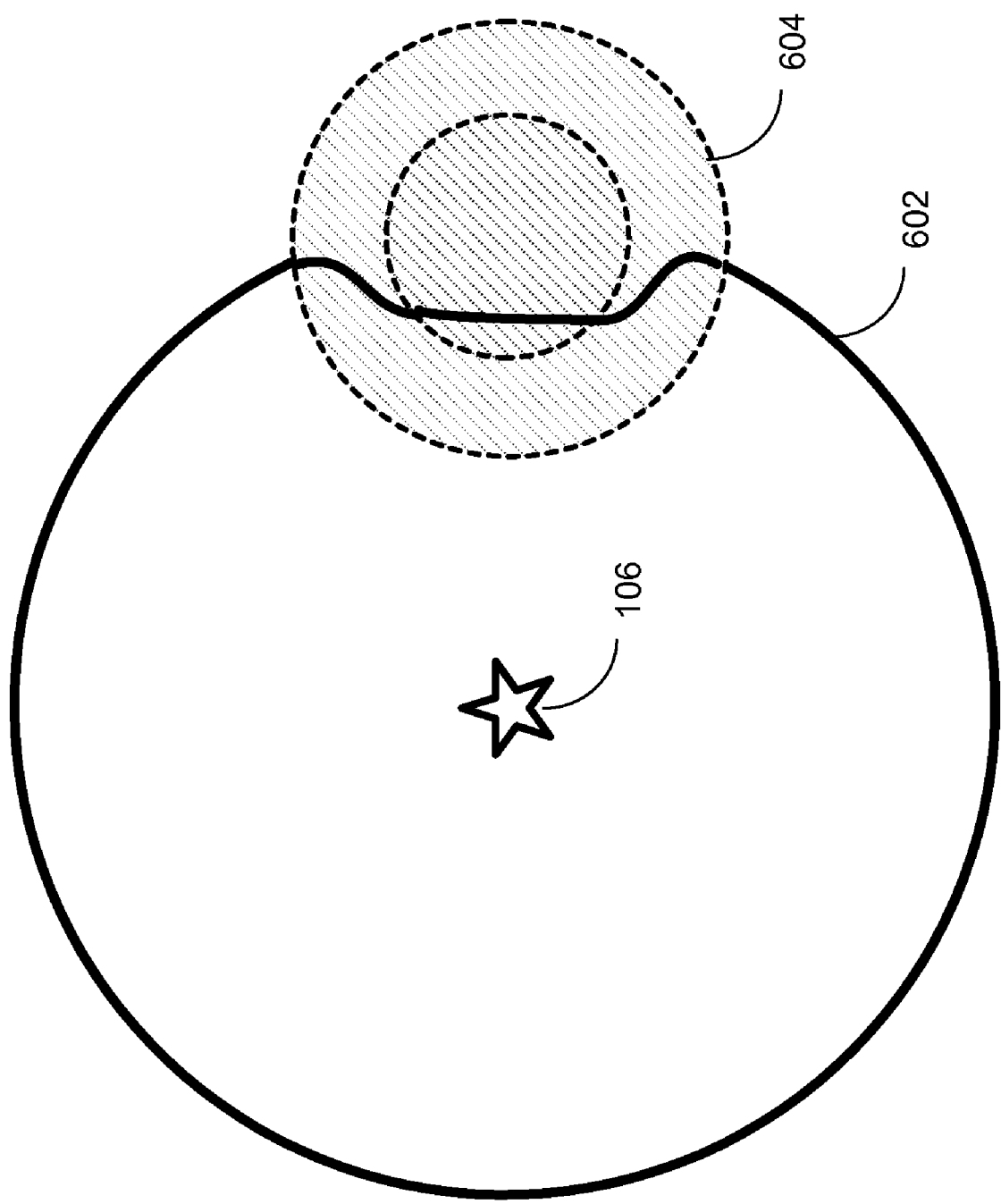
FIG. 6 depicts the effects of a single hill on a circle of constant range for a DTV transmitter that is located at the same altitude as the surrounding land.

In one implementation the position location calculation includes the effects of ground elevation. Thus in terrain with hills and valleys relative to the phase center of the DTV transmitter 106 the circles of constant range are distorted. FIG. 6 depicts the effects of a single hill 604 on a circle of constant range 602 for a DTV transmitter 106 that is located at the same altitude as the surrounding land.

The computations of user position are easily made by a simple computer having as its database a terrain topographic map which allows the computations to include the effect of user altitude on the surface of the earth, the geoid. This calculation has the effect of distorting the circles of constant range as shown in FIG. 6.

Monitor Units

Figure 7:
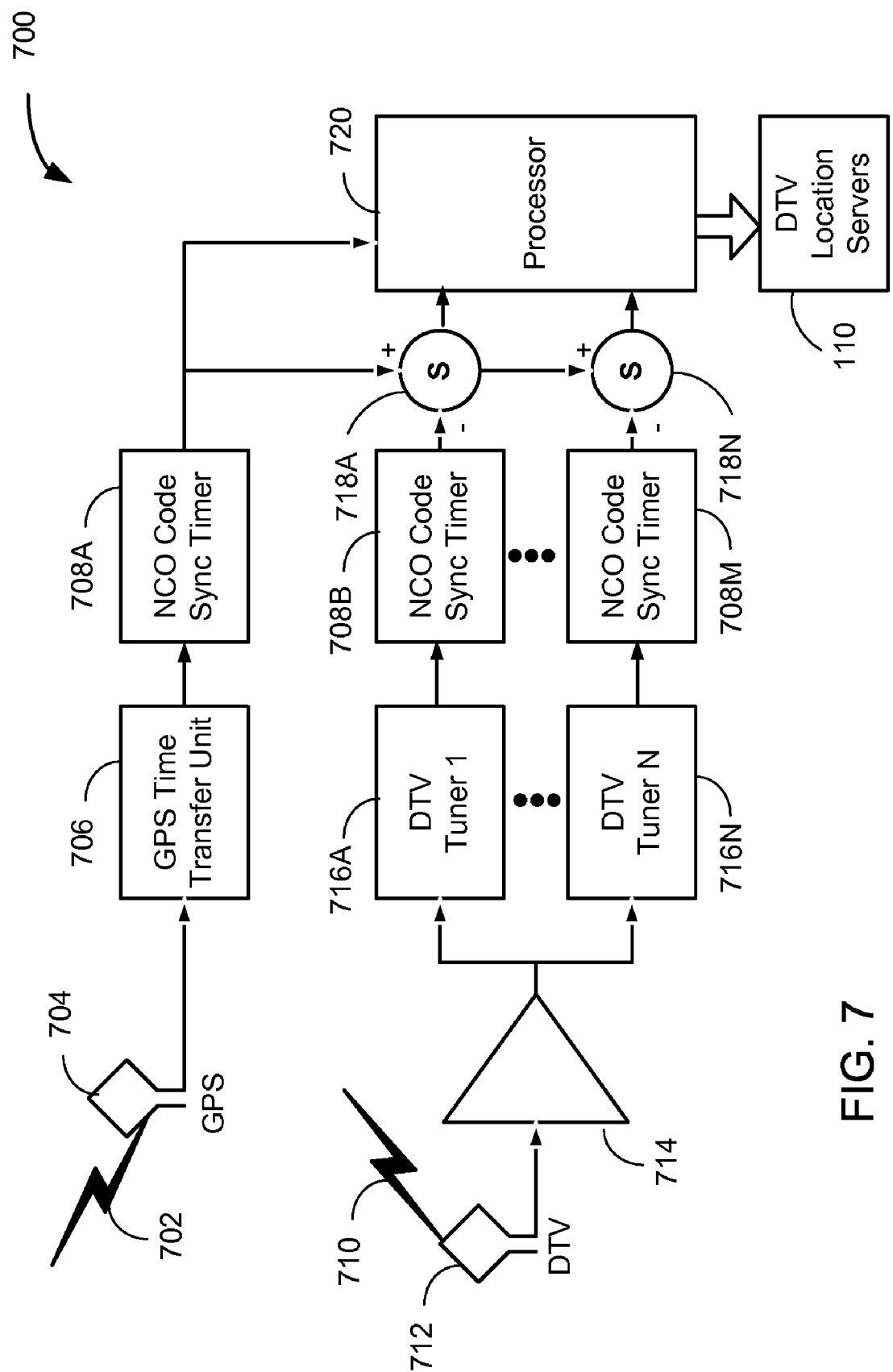
FIG. 7 depicts an implementation of a monitor unit.
Figure 8:
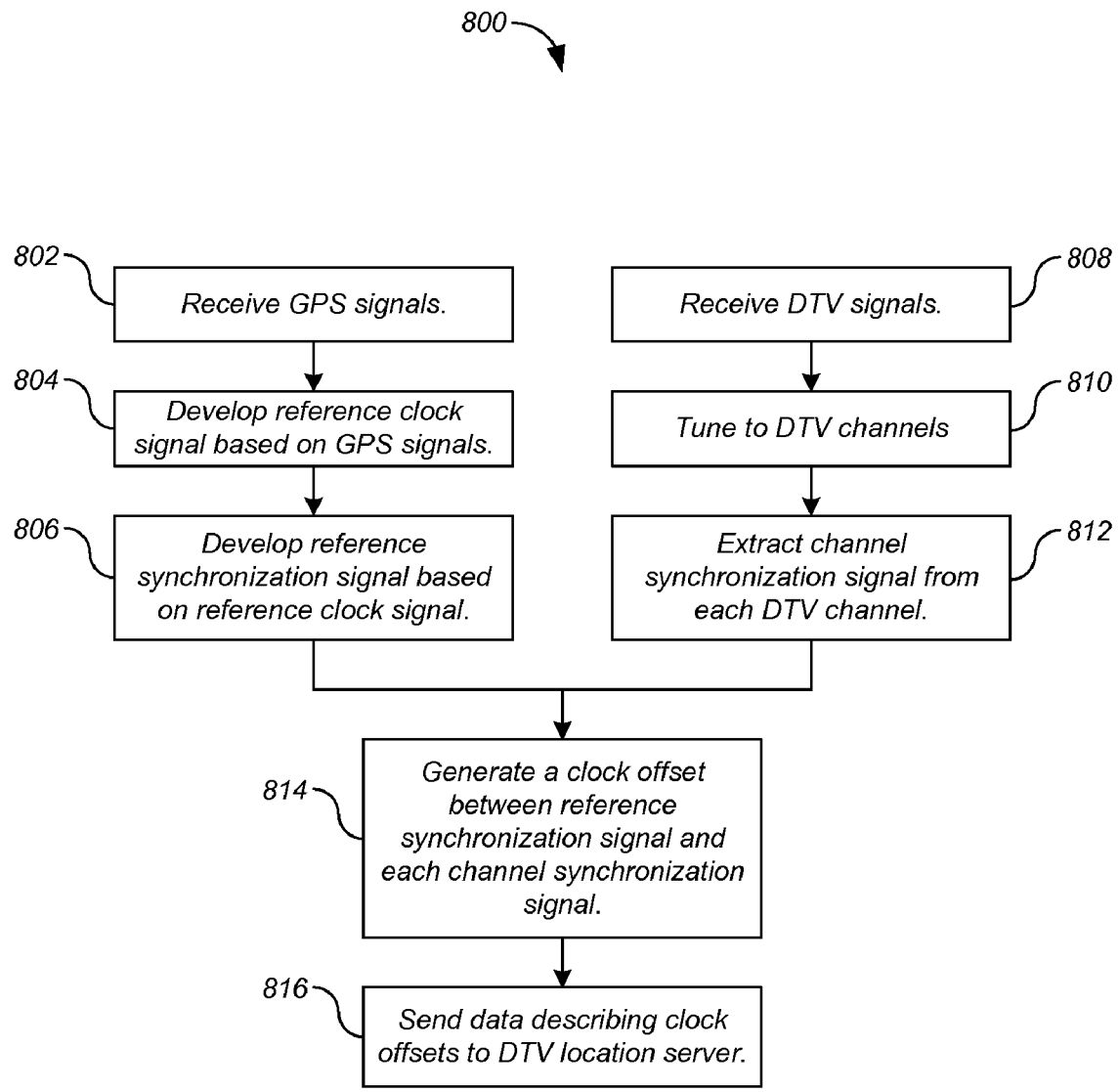
FIG. 8 shows a process for the implementation of FIG. 7.

FIG. 7 depicts an implementation 700 of monitor unit 108 of FIG. 1. Implementation 700 can be fixed or mobile, as discussed above. FIG. 8 shows a process for implementation 700 of FIG. 7. An antenna 704 receives GPS signals 702 (step 802). A GPS time transfer unit 706 develops a reference clock signal based on the GPS signals (step 804).

In order to determine the offset of the DTV transmitter clocks, a NCO (numerically controlled oscillator) code synchronization timer 708A develops a reference synchronization signal based on the reference clock signal (step 806). The reference synchronization signal can include scattered pilot carriers. In one implementation, the NCO field synchronization timers 708A in all of the monitor units 108 are synchronized to a base date and time. In implementations where a single monitor unit 108 receives DTV signals from all of the same DTV transmitters that user terminal 102 does, it is not necessary to synchronize that monitor unit 108 with any other monitor unit for the purposes of determining the position of user terminal 102. Such synchronization is also unnecessary if all of the monitor units 108, or all of the DTV transmitters, are synchronized to a common clock.

A DTV antenna 712 receives a plurality of DTV signals 710 (step 808). In some implementations, multiple DTV antennas are used. An amplifier 714 amplifies the DTV signals. One or more DTV tuners 716A through 716N each tunes to a DTV channel in the received DTV signals to produce a DTV channel signal (step 810). Each of a plurality of NCO code synchronization timers 708B through 708M receives one of the DTV channel signals. Each of NCO code synchronization timers 708B through 708M extracts a channel synchronization signal from a DTV channel signal (step 812). The channel synchronization signal can include scattered pilot carriers. In one implementation, the continuous pilot signal and symbol clock signal are used as acquisition aids.

Each of a plurality of summers 718A through 718N generates a clock offset between the reference synchronization signal and one of the channel synchronization signals (step 814). Processor 720 formats and sends data describing the clock offsets to DTV location server 110 (step 816). In various implementations, this data includes, for each DTV channel measured, one or more of: the identification number of the DTV transmitter, the DTV channel number, the antenna phase center for the DTV transmitter, and the clock offset. This data can be transmitted by any of a number of methods including air link and the Internet. In some implementations, the data is broadcast in spare MPEG packets on the DTV channel itself.

Monitor Units Without GPS

In some embodiments, either no GPS signals are available to the user terminals, for example because they are indoors, or the user terminals do not have GPS receivers. In such embodiments, the user terminals can still be used as monitor units. For example, K TV broadcast signals are observed by each of M user terminals. For the $m^{th}$ user terminal the following parameters are unknown: position in 2-D space given by $\underline{r}_m = (x_m, y_m)$ and the clock offset $\alpha_m$ of the internal clock. Thus for M mobile devices there are 3M unknown parameters.

For the K TV broadcast signals only the transmitter clock offsets are unknown. Thus for the $k^{th}$ TV broadcast signal, the unknown time offset of the internal clock is denoted $\beta_k$, while the known 2-D location of the transmitter of the TV signal is given by $\underline{a}_k$. Thus for K TV transmitters the number of unknown parameters is K. Because only the relative time offsets are needed, set one of the offsets is set to zero. Thus there are only K−1 unknown parameters for these K TV broadcast signals.

When performing a position location computation, the $m^{th}$ user terminal computes the pseudo range to the $k^{th}$ TV broadcast signal as $ct_{mk}$ where c is the speed of light (radio propagation speed) and $t_{mk}$ is the pseudo time delay measurement based on a peak output of correlation with a known synchronization segment in the TV broadcast signal. This pseudo range satisfies the equation $$ct_{mk}=|\underline{r}_m-\underline{a}_k|+\alpha_m+\beta_k \quad (8)$$

for m=1, 2, 3, ..., M and k=1, 2, 3, ... K.

Note that this results in MK equations for 3M+K−1 unknown parameters.

Thus if $$MK \geq 3M+K-1 \quad (9)$$

the equations (8) can be solved for the 3M+K−1 unknown parameters.

Software Receivers

One thorough approach to mitigating the effects of multipath is to sample an entire autocorrelation function, rather than to use only early and late samples as in a hardware setup. Multipath effects can be mitigated by selecting the earliest correlation peak.

In the case that position can be computed with a brief delay, such as in E911 applications, a simple approach is to use a software receiver, which samples a sequence of the filtered signal, and then processes the sample in firmware on a DSP.

Figure 9:
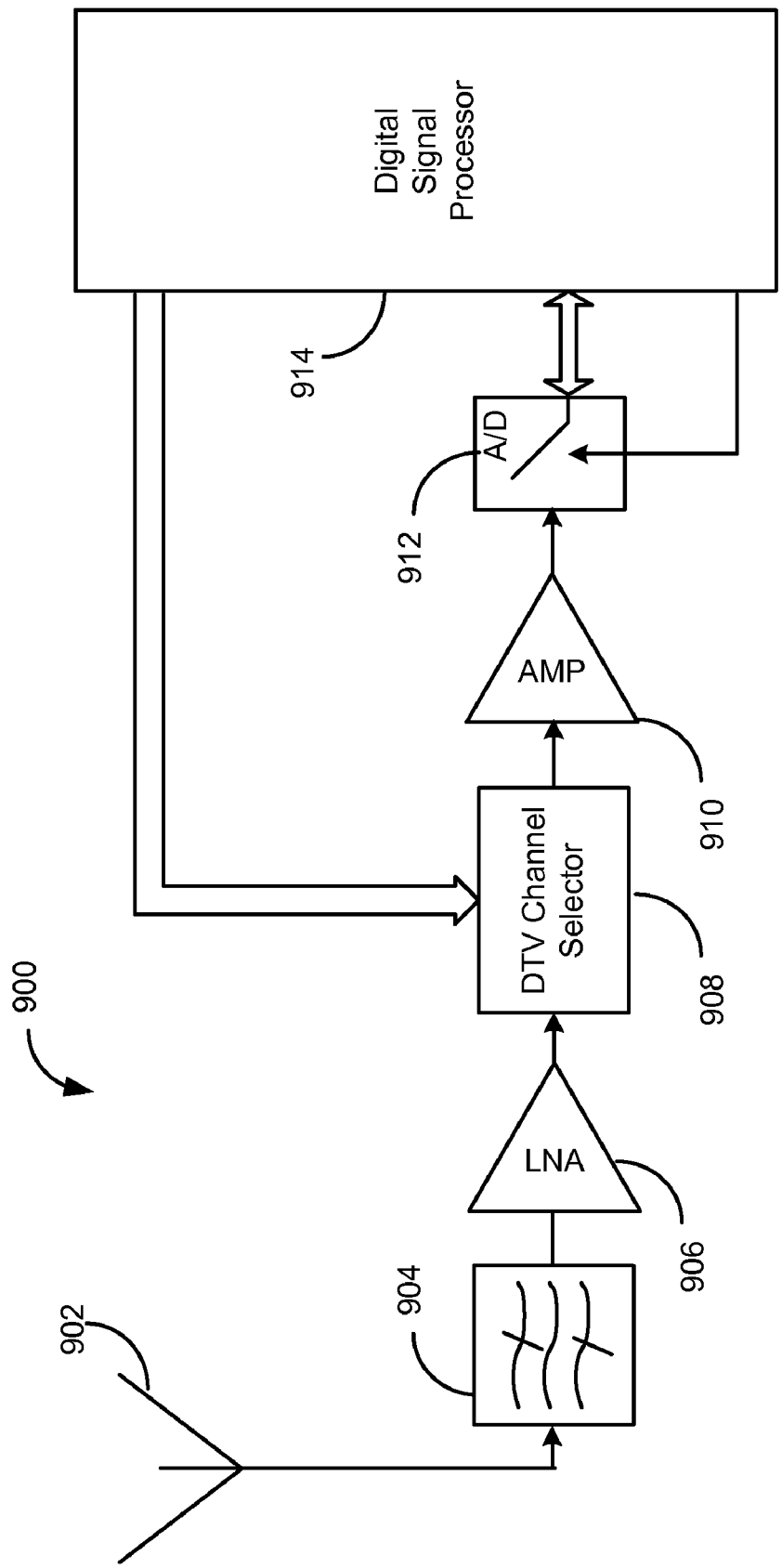
FIG. 9 illustrates one implementation for tracking in software.

FIG. 9 illustrates one implementation 900 for tracking in software. An antenna 902 receives a DTV signal. Antenna 902 can be a magnetic dipole or any other type of antenna capable of receiving DTV signals. A bandpass filter 904 passes the entire DTV signal spectrum to an LNA 906. In one implementation, filter 904 is a tunable bandpass filter that passes the spectrum for a particular DTV channel under the control of a digital signal processor (DSP) 914.

A low-noise amplifier (LNA) 906 amplifies and passes the selected signal to a DTV channel selector 908. DTV channel selector 908 selects a particular DTV channel under the control of DSP 914, and filters and downconverts the selected channel signal from UHF (ultra-high frequency) to IF (intermediate frequency) according to conventional methods. An amplifier (AMP) 910 amplifies the selected IF channel signal. An analog-to-digital converter and sampler (A/D) 912 produces digital samples of the DTV channel signal s(t) and passes these samples to DSP 914.

Now the processing of the DTV channel signal by DSP 914 is described for a coherent software receiver. A nominal offset frequency for the downconverted sampled signal is assumed. If this signal is downconverted to baseband, the nominal offset is 0 Hz. The process generates the complete autocorrelation function based on samples of a signal s(t). The process may be implemented far more efficiently for a low duty factor signal. Let $T_i$ be the period of data sampled, $\omega_{in}$ be the nominal offset of the sampled incident signal, and let $\omega_{offset}$ be the largest possible offset frequency, due to Doppler shift and oscillator frequency drift. The process implements the pseudocode listed below.

$R_{max}=0$

Create a complex code signal
$s_{code}(t)=C_i(t)+jC_q(t)$ where $C_i$ is the function describing the in-phase baseband signal and $C_q$ is the function describing the quadrature baseband signal.

Compute $F\{s_{code}\}^*$ where F is the Fourier transform operator, and * is the conjugate operator.

For $\omega=\omega_{in}-\omega_{offset}$ to $\omega_{in}+\omega_{offset}$ step $\pi/2T_i$ Create a complex mixing signal $s_{mix}(t)=\cos(\omega t)+j\sin(\omega t)$, $t=[0 \ldots T_i]$ Combine the incident signal s(t) and the mixing signal $s_{mix}(t)$ $s_{comb}(t)=s(t)s_{mix}(t)$ Compute the correlation function $R(\tau)=F^{-1}\{F(s_{code})F(S_{comb})\}$ If $\max_\tau|R(\tau)|>R_{max}$, $R_{max} \leftarrow \max_\tau|R(\tau)|$, $R_{store}(\tau)=R(\tau)$ Next $\omega$ Upon exit from the process, $R_{store}(\tau)$ will store the correlation between the incident signal s(t) and the complex code signal $s_{code}(t)$. $R_{store}(\tau)$ may be further refined by searching over smaller steps of $\omega$. The initial step size for $\omega$ must be less then half the Nyquist $$\frac{2\pi}{T_i}.$$

The time offset $\tau$ that produces the maximum correlation output is used as the pseudo-range.

ALTERNATE EMBODIMENTS

The invention can be implemented in digital electronic circuitry, or in computer hardware, firmware, software, or in combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of embodiments of the invention have been described. Nevertheless, it will be understood that various modifications may be made without departing from the spirit and scope of the invention.

For example, while various signals and signal processing techniques are discussed herein in analog form, digital implementations will be apparent to one skilled in the relevant art after reading this description.

For example, although one method for tracking the signal is described, it should be clear that there are several methods of tracking these signals using various forms of conventional delay lock loops and through the use of various types of matched filters.

While implementations of the invention are discussed with reference to the 8 MHz signal, implementations can be used with signals of other bandwidths. Further, implementations of the invention can employ a subset of the bandwidth of the signal. For example, an implementation of the invention can achieve satisfactory results using only 6 MHz of an 8 MHz signal. Implementations of the invention can be extended to use future enhancements to the signal.

Implementations of the present invention exploit the low duty factor of the DTV signal in many ways. For example, one implementation employs a time-gated delay-lock loop (DLL) such as that disclosed in J. J. Spilker, Jr., Digital Communications by Satellite, Prentice-Hall, Englewood Cliffs N.J., 1977, Chapter 18-6. Other implementations employ variations of the DLL, including coherent, noncoherent, and quasi-coherent DLLs, such as those disclosed in J. J. Spilker, Jr., Digital Communications by Satellite, Prentice-Hall, Englewood Cliffs N.J., 1977, Chapter 18 and B. Parkinson and J. Spilker, Jr., Global Positioning System-Theory and Applications, AIAA, Washington, D.C., 1996, Vol. 1, Chapter 17, Fundamentals of Signal Tracking Theory by J. Spilker, Jr. Other implementations employ various types of matched filters, such as a recirculating matched filter.

In some implementations, DTV location server 110 employs redundant signals available at the system level, such as pseudo-ranges available from the DTV transmitters, making additional checks to validate each DTV channel and pseudo-range, and to identify DTV channels that are erroneous. One such technique is conventional receiver autonomous integrity monitoring (RAIM).

Accordingly, other embodiments are within the scope of the following claims.

What is claimed is:

1. An apparatus comprising:
    a reference clock;
    a receiver to receive a wireless television signal, wherein the wireless television signal is transmitted by a television transmitter according to a transmitter clock; and
    a clock offset unit to determine a clock offset between the reference clock and the transmitter clock based on the wireless television signal;
    wherein a location of a user terminal is determined based on the clock offset, a pseudorange determined between the user terminal and the television transmitter based on the wireless television signal, and a location of the television transmitter.

2. The apparatus of claim 1, wherein the wireless television signal comprises at least one of:
    an American Television Standards Committee (ATSC) digital television (DTV) signal;
    a Digital Video Broadcasting (DVB) signal;
    an Integrated Services Digital Broadcasting-Terrestrial (ISDB-T) signal; and
    a National Television System Committee (NTSC) analog television signal.

3. The apparatus of claim 1, further comprising:
    a processor to determine the location of the user terminal.

4. The apparatus of claim 1, further comprising:
    a satellite receiver to receive a satellite positioning signal;
    a processor to determine the location of the receiver based on the satellite positioning signal; and
    a time transfer unit to adjust the reference clock based on the satellite positioning signal.

5. The apparatus of claim 4:
    wherein the satellite positioning signal comprises a global positioning system (GPS) signal.

6. An apparatus comprising:
    means for generating a reference clock signal;
    means for receiving a wireless television signal, wherein the wireless television signal is transmitted by a television transmitter according to a transmitter clock; and
    means for determining a clock offset between the reference clock signal and the transmitter clock based on the wireless television signal;
    wherein a location of a user terminal is determined based on the clock offset, a pseudorange determined between the user terminal and the television transmitter based on the wireless television signal, and a location of the television transmitter.

7. The apparatus of claim 6, wherein the wireless television signal comprises at least one of:
    an American Television Standards Committee (ATSC) digital television (DTV) signal;
    a Digital Video Broadcasting (DVB) signal;
    an Integrated Services Digital Broadcasting-Terrestrial (ISDB-T) signal; and
    a National Television System Committee (NTSC) analog television signal.

8. The apparatus of claim 6, further comprising:
    means for determining the location of the user terminal.

9. The apparatus of claim 6, further comprising:
    means for receiving a satellite positioning signal;
    means for determining the location of the receiver based on the satellite positioning signal; and
    means for adjusting the reference clock signal based on the satellite positioning signal.

10. The apparatus of claim 9:
    wherein the satellite positioning signal comprises a global positioning system (GPS) signal.

11. A method comprising:
    generating a reference clock signal;
    receiving a wireless television signal, wherein the wireless television signal is transmitted by a television transmitter according to a transmitter clock; and
    determining a clock offset between the reference clock signal and the transmitter clock based on the wireless television signal;
    wherein a location of a user terminal is determined based on the clock offset, a pseudorange determined between the user terminal and the television transmitter based on the wireless television signal, and a location of the television transmitter.

12. The method of claim 11, wherein the wireless television signal comprises at least one of:
    an American Television Standards Committee (ATSC) digital television (DTV) signal;
    a Digital Video Broadcasting (DVB) signal;
    an Integrated Services Digital Broadcasting-Terrestrial (ISDB-T) signal; and a National Television System Committee (NTSC) analog television signal.

13. The method of claim 11, further comprising:
determining the location of the user terminal.

14. The method of claim 11, further comprising:
receiving a satellite positioning signal;
determining the location of the receiver based on the satellite positioning signal; and
adjusting the reference clock signal based on the satellite positioning signal.

15. The method of claim 14:
wherein the satellite positioning signal comprises a global positioning system (GPS) signal.

* * * * *